US012781788B2

(12) United States Patent
Huang et al.

(10) Patent No.: US 12,781,788 B2
(45) Date of Patent: Nov. 3, 2026

(54) POSITIONING STRUCTURE AND POSITIONING DEVICE

(71) Applicant: PEGATRON CORPORATION, Taipei City (TW)

(72) Inventors: Chu-Lin Huang, Taipei City (TW); Ti-Hsing Hsieh, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 413 days.

(21) Appl. No.: 18/581,284

(22) Filed: Feb. 19, 2024

(65) Prior Publication Data

US 2024/0426334 A1 Dec. 26, 2024

(30) Foreign Application Priority Data

Jun. 20, 2023 (TW) ................................ 112123241

(51) Int. Cl.
*F16B 39/24* (2006.01)
*F16B 39/282* (2006.01)

(52) U.S. Cl.
CPC ............ *F16B 39/24* (2013.01); *F16B 39/282* (2013.01)

(58) Field of Classification Search
CPC ............................... F16B 39/24; F16B 39/382
See application file for complete search history.

(56) References Cited

U.S. PATENT DOCUMENTS

| | | | | |
|---|---|---|---|---|
| 3,203,302 | A * | 8/1965 | Frederick | F16B 37/02 29/520 |
| 4,618,300 | A * | 10/1986 | Goebel | B25B 9/00 411/433 |
| 5,378,100 | A * | 1/1995 | Fullerton | F16B 37/0857 411/270 |
| 9,604,404 | B2 * | 3/2017 | Ericksen | F16L 37/008 |

FOREIGN PATENT DOCUMENTS

| | | |
|---|---|---|
| CN | 210739093 | 6/2020 |
| CN | 216642755 | 5/2022 |

* cited by examiner

*Primary Examiner* — Vishal A Patel
(74) *Attorney, Agent, or Firm* — J.C. PATENTS

(57) ABSTRACT

A positioning structure includes a first bush, a positioning washer, a bolt, and a button. The first bush has a first and a second opening. The positioning washer is fixed in the first bush, and includes a positioning hole aligned to the first opening and multiple positioning elastic pieces circumferentially arranged in the positioning hole. The bolt is adapted to be inserted into the first bush from the first opening and passes through the positioning hole. At least one of the positioning elastic pieces is engaged with a thread of the bolt. The button is inserted into the first bush from the second opening and contacts the positioning elastic pieces. The button is adapted to slide toward the first opening to push the positioning elastic pieces to deform, so that the positioning elastic pieces are separated from the thread, and the bolt is loosened from the positioning washer.

10 Claims, 6 Drawing Sheets

POSITIONING STRUCTURE AND POSITIONING DEVICE

CROSS-REFERENCE TO RELATED APPLICATION

This application claims the priority benefit of Taiwan application serial no. 112123241, filed on Jun. 20, 2023. The entirety of the above-mentioned patent application is hereby incorporated by reference herein and made a part of this specification.

BACKGROUND

Technology Field

The disclosure relates to a positioning structure and a positioning device, and more particularly, to a positioning structure and a positioning device with a design of quick disassembly and assembly.

Description of Related Art

A common positioning structure is to fix a target object by engagement of an external thread of a bolt and an internal thread of a screw hole. Once there is a need to disassemble and assemble the target object, an operator is required to use tools (e.g., a screwdriver or wrench) to loosen the bolt to disassemble the target object, or tighten the bolt to fix the target object. However, due to space limitations or interference of obstacles, it is difficult for the tools (e.g., the screwdriver or wrench) to reach a working position (i.e., a head of the bolt), or even if the tool can reach the working position, the operator is unable or difficult to apply force to loosen or tighten the bolt, making disassembly and assembly operations time-consuming and difficult.

SUMMARY

The disclosure provides a positioning structure and a positioning device, which are easy and fast to disassemble and assemble.

The disclosure provides a positioning structure, including a first bush, a positioning washer, a bolt, and a button. The first bush has a first opening and a second opening opposite to and communicating with each other. The positioning washer is fixed in the first bush, and includes a positioning hole aligned to the first opening and multiple positioning elastic pieces circumferentially arranged in the positioning hole. The bolt is adapted to be inserted into the first bush from the first opening and passes through the positioning hole. At least one of the positioning elastic pieces is engaged with a thread of the bolt, so that the bolt is fixed by the positioning washer. The button is inserted into the first bush from the second opening and contacts the positioning elastic pieces. The button is adapted to slide toward the first opening and push the positioning elastic pieces to deform, so that the positioning elastic pieces are separated from the thread, and the bolt is loosened from the positioning washer.

The disclosure provides positioning device, including a first positioning member, a positioning structure, and a second positioning member. The first positioning member includes an installation hole. The positioning structure is adapted to be installed in the installation hole. The positioning structure includes a first bush fixed in the installation hole, a positioning washer fixed in the first bush, a bolt, and a button. The first bush has a first opening and a second opening opposite to and communicating with each other. The positioning washer includes a positioning hole aligned to the first opening and multiple positioning elastic pieces circumferentially arranged in the positioning hole. The button is inserted into the first bush from the second opening and contacts the positioning elastic pieces of the positioning washer. The second positioning member has a bolt hole. The bolt is adapted to pass through the bolt hole and be inserted into the positioning structure in the installation hole to which the bolt hole is aligned. The bolt is inserted into the first bush from the first opening and passes through the positioning hole of the positioning washer. At least one of the positioning elastic pieces of the positioning washer is engaged with a thread of the bolt, so that the bolt is fixed by the positioning washer, and a head of the bolt presses against the second positioning member to fix the second positioning member to the first positioning member. When the button slides toward the first opening and pushes the positioning elastic pieces to deform, the positioning elastic pieces are separated from the thread, so that the bolt is loosened from the positioning washer, and the second positioning member is loosened from the first positioning member.

Based on the above, the operator may quickly fix the second positioning member to the first positioning member or remove the second positioning member from the first positioning member through the two-way pressing mechanism. That is to say, the positioning structure and the positioning device using the positioning structure in the disclosure are not only convenient for the operator to quickly disassemble and assemble, but the disassembly and assembly mechanism is also quite simple and intuitive.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
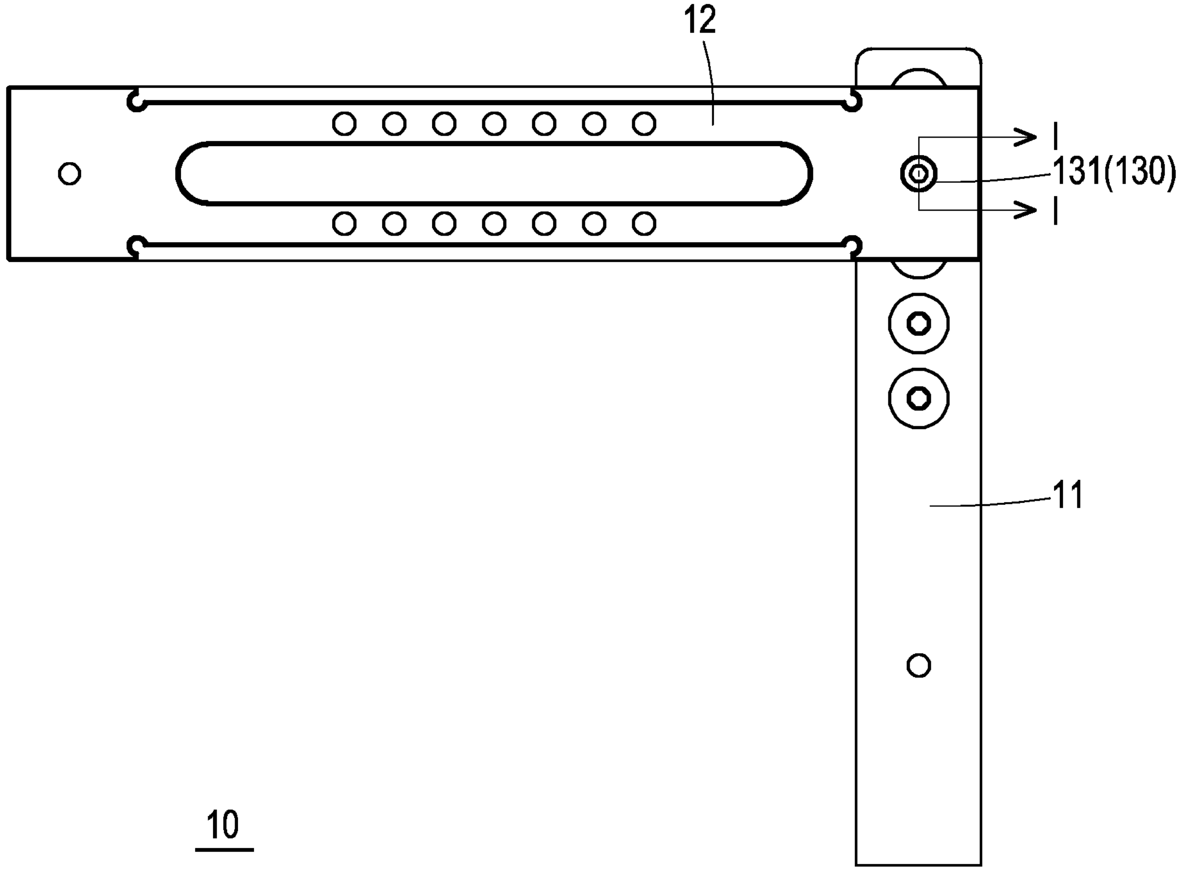
FIG. 1 is a schematic view of a positioning device according to an embodiment of the disclosure.
Figure 2:
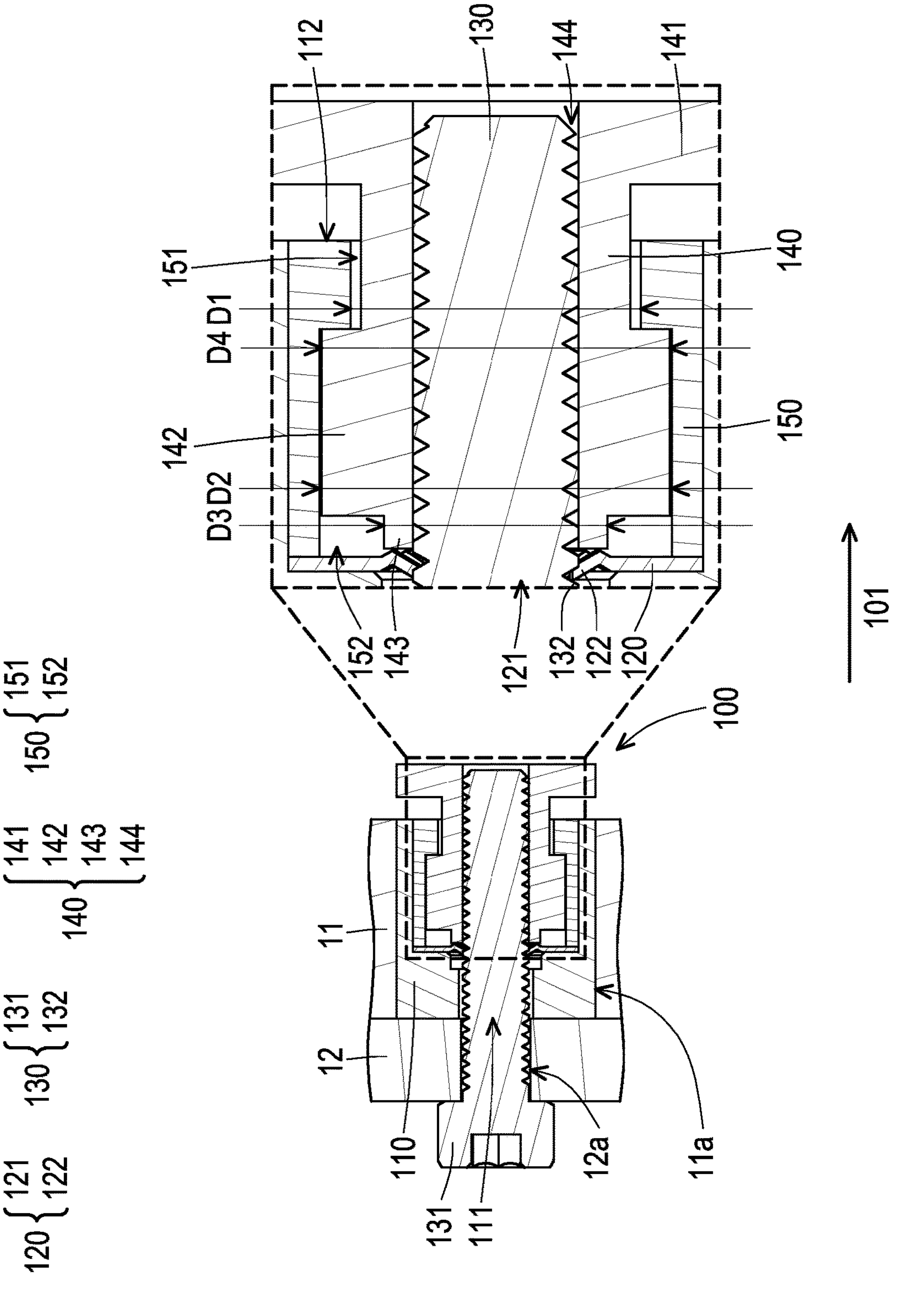
FIG. 2 is a schematic partial cross-sectional view of the positioning device in FIG. 1 taken along a section line I-I.

FIG. 1 is a schematic view of a positioning device according to an embodiment of the disclosure. FIG. 2 is a schematic partial cross-sectional view of the positioning device in FIG. 1 taken along a section line I-I. Referring to FIGS. 1 and 2, in this embodiment, a positioning device 10 includes a first positioning member 11, multiple positioning structures 100, and a second positioning member 12. The first positioning member 11 has an installation hole 11*a*, and the positioning structure 100 is installed in the installation hole 11*a*. In addition, the second positioning member 12 has a bolt hole 12*a*. The bolt hole 12*a* is aligned to the installation hole 11*a*, and the second positioning member 12 is fixed to the first positioning member 11 by the positioning structure 100 in the installation hole 11*a* to which the bolt hole 12*a* is aligned.

For example, the first positioning member 11 may have multiple installation holes 11*a*, and each of the installation holes 11*a* is provided with the positioning structure 100. An operator may adjust a position (e.g., a high and low position) of the second positioning member 12 according to requirements such that the bolt hole 12*a* is aligned to one of the installation holes 11*a*, and the second positioning member 12 is fixed to the first positioning member 11 by the positioning structure 100 in the installation hole 11*a* to which the bolt hole 12*a* is aligned.

Figure 3:
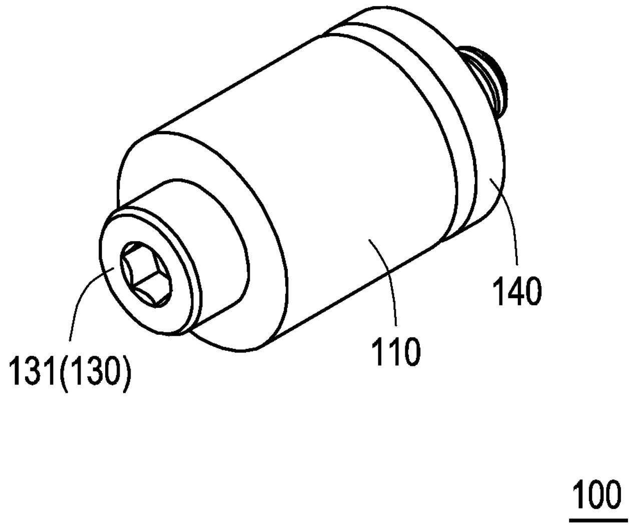
FIG. 3 is a schematic view of a positioning structure according to an embodiment of the disclosure.
Figure 4:
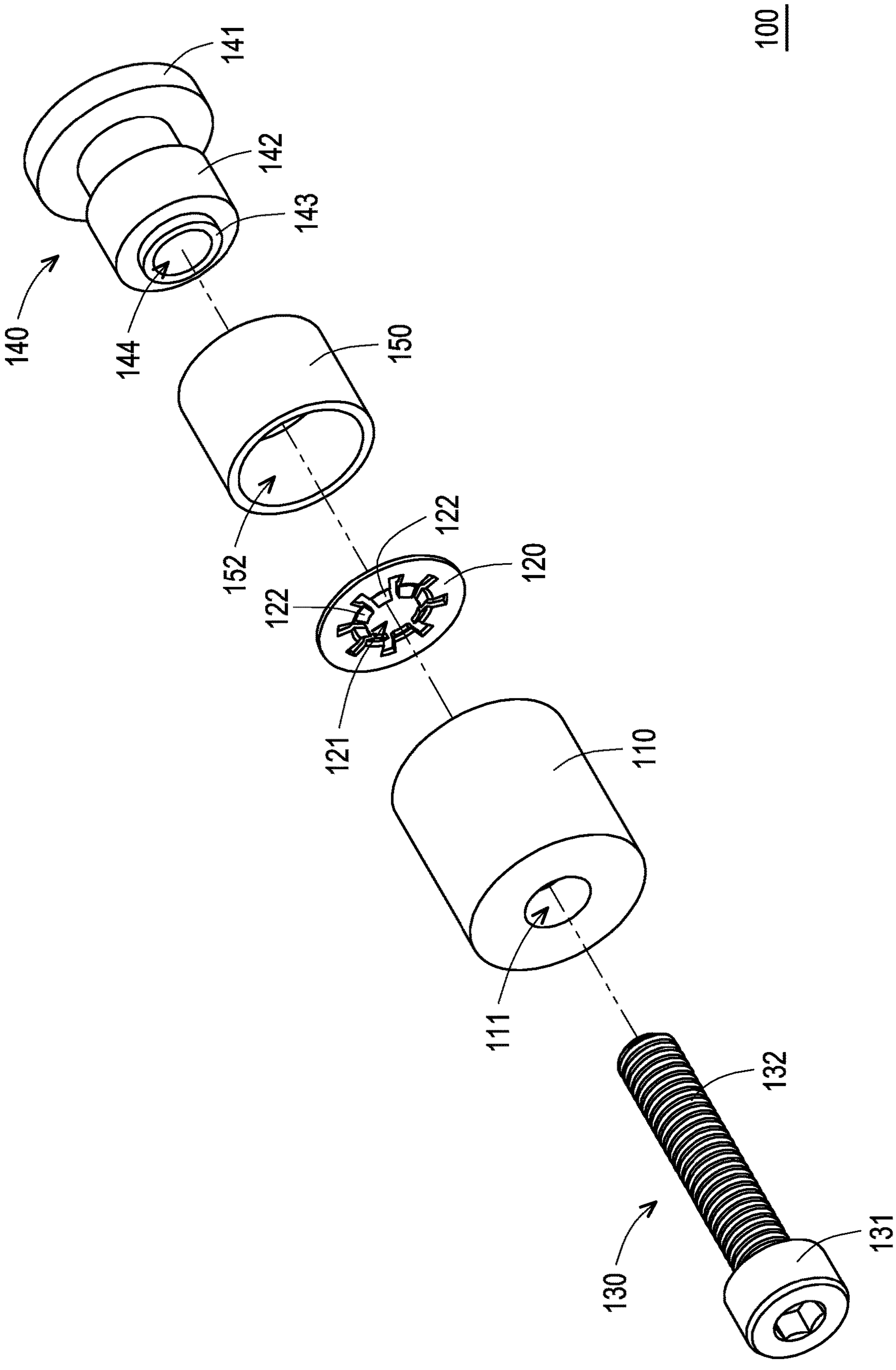
FIG. 4 is a schematic exploded view of the positioning structure in FIG. 3.

FIG. 3 is a schematic view of a positioning structure according to an embodiment of the disclosure. FIG. 4 is a schematic exploded view of the positioning structure in FIG. 3.

Referring to FIGS. 2 to 4, the positioning structure 100 includes a first bush 110, a positioning washer 120, a bolt 130, and a button 140. The first bush 110 is fixed in the installation hole 11*a* and has a first opening 111 and a second opening 112 opposite to and communicating with each other. In addition, the positioning washer 120 is fixed in the first bush 110 and includes a positioning hole 121 aligned to the first opening 111 and multiple positioning elastic pieces 122 circumferentially arranged in the positioning hole 121.

In a process of fixing the second positioning member 12 to the first positioning member 11, the operator first aligns the bolt hole 12*a* to the installation hole 11*a*, especially to the first opening 111 of the first bush 110 fixed in the installation hole 11*a*, then aligns the bolt 130 to the bolt hole 12*a*, and press the bolt 130 along a first direction 101, so that the bolt 130 sequentially passes through the bolt hole 12*a* and the first opening 111 to be inserted into the first bush 110, and further passes through the positioning hole 121 of the positioning washer 120.

In detail, the bolt 130 includes a head 131 and a thread 132. The operator continues to press the bolt 130 along the first direction 101, so that the head 131 presses against the second positioning member 12. On the other hand, the bolt 130 passing through the positioning hole 121 has structural interference with the positioning elastic pieces 122, and at least one of the positioning elastic pieces 122 is engaged with or embedded in the thread 132, so that the bolt 130 is fixed by the positioning washer 120. When the head 131 presses against the second positioning member 12, and the bolt 130 is fixed by the positioning washer 120, the second positioning member 12 is sandwiched and fixed between the head 131 and the first positioning member 11.

Referring to FIGS. 2 and 4, the positioning structure 100 further includes a second bush 150 inserted into the first bush 110 from the second opening 112 to press against the positioning washer 120. The second bush 150 is fixed in the first bush 110 to fix the positioning washer 120 in the first bush 110 and prevent the positioning washer 120 from shifting in the first bush 110. For example, the positioning washer 120 is fixed between the first opening 111 and the second bush 150. An outer diameter of the positioning washer 120 and an outer diameter of the second bush 150 are substantially equal to a diameter of the second opening 112 and greater than a diameter of the first opening 111.

On the other hand, the button 140 is inserted into the first bush 110 from the second opening 112, specifically into the second bush 150 located in the first bush 110, and contacts the positioning elastic pieces 122 of the positioning washer 120 pressed against by the second bush 150. In detail, the button 140 is slidably disposed on a side of the second bush 150 opposite to the positioning washer 120, and includes a pressing portion 141 located outside the first bush 110 and the second bush 150 and an unlocking portion 143 located inside the second bush 150 and connected to a sliding portion 142. The pressing portion 141 and the unlocking portion 143 are respectively located on two opposite sides of the sliding portion 142. The unlocking portion 143 is located between the sliding portion 142 and the positioning washer 120, and the unlocking portion 143 remains in contact with the positioning elastic pieces 122.

The button 140 has a through hole 144 penetrating the pressing portion 141, the sliding portion 142, and the unlocking portion 143. The through hole 144 is aligned to the positioning hole 121 of the positioning washer 120, and the bolt 130 passes through the through hole 144. When the bolt 130 is not fixed by the positioning washer 120, the bolt 130 may slide within the through hole 144.

Figure 5:
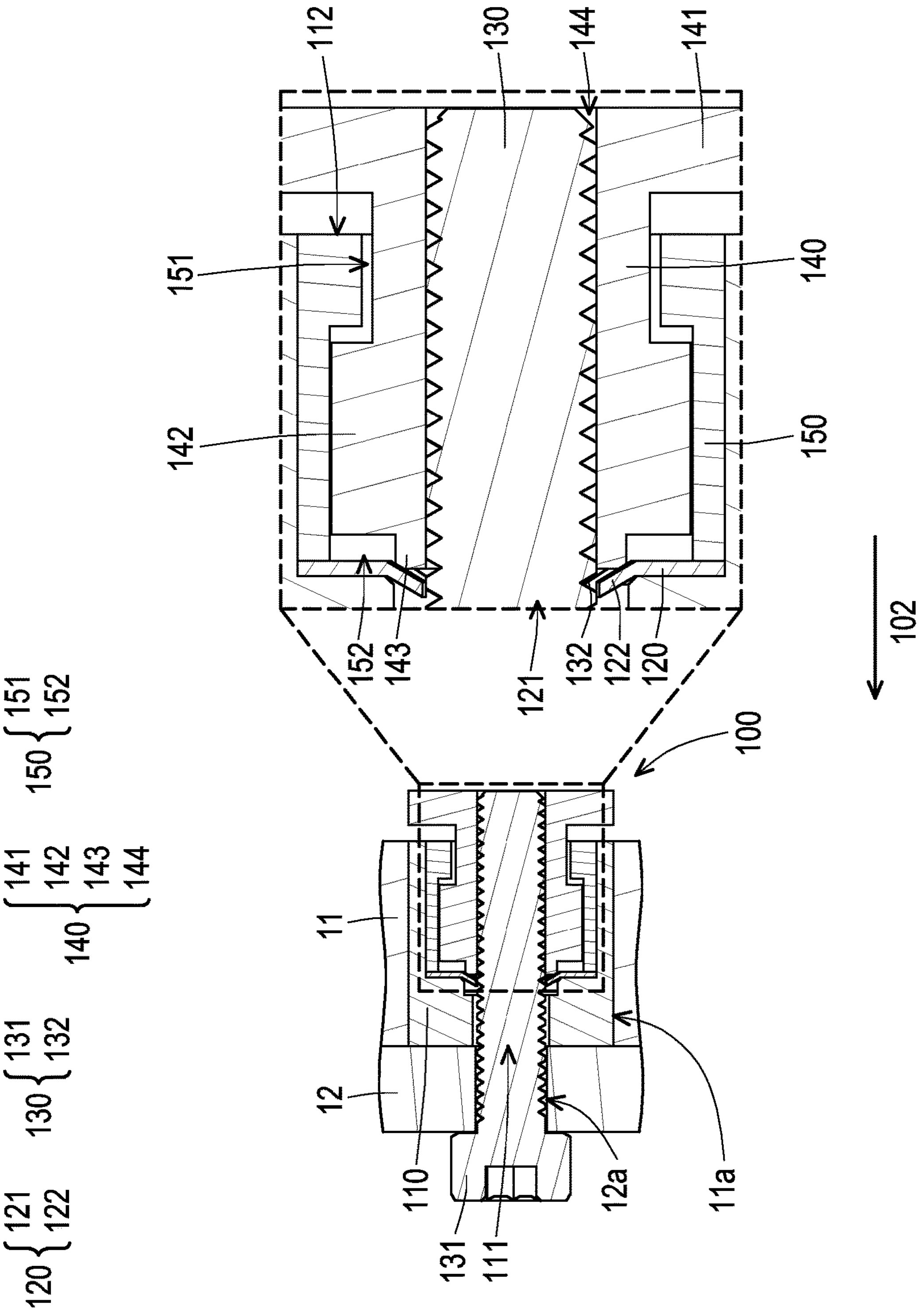
FIGS. 5 and 6 are schematic views of a disassembly process of a bolt and a second positioning member in FIG. 2.
Figure 6:
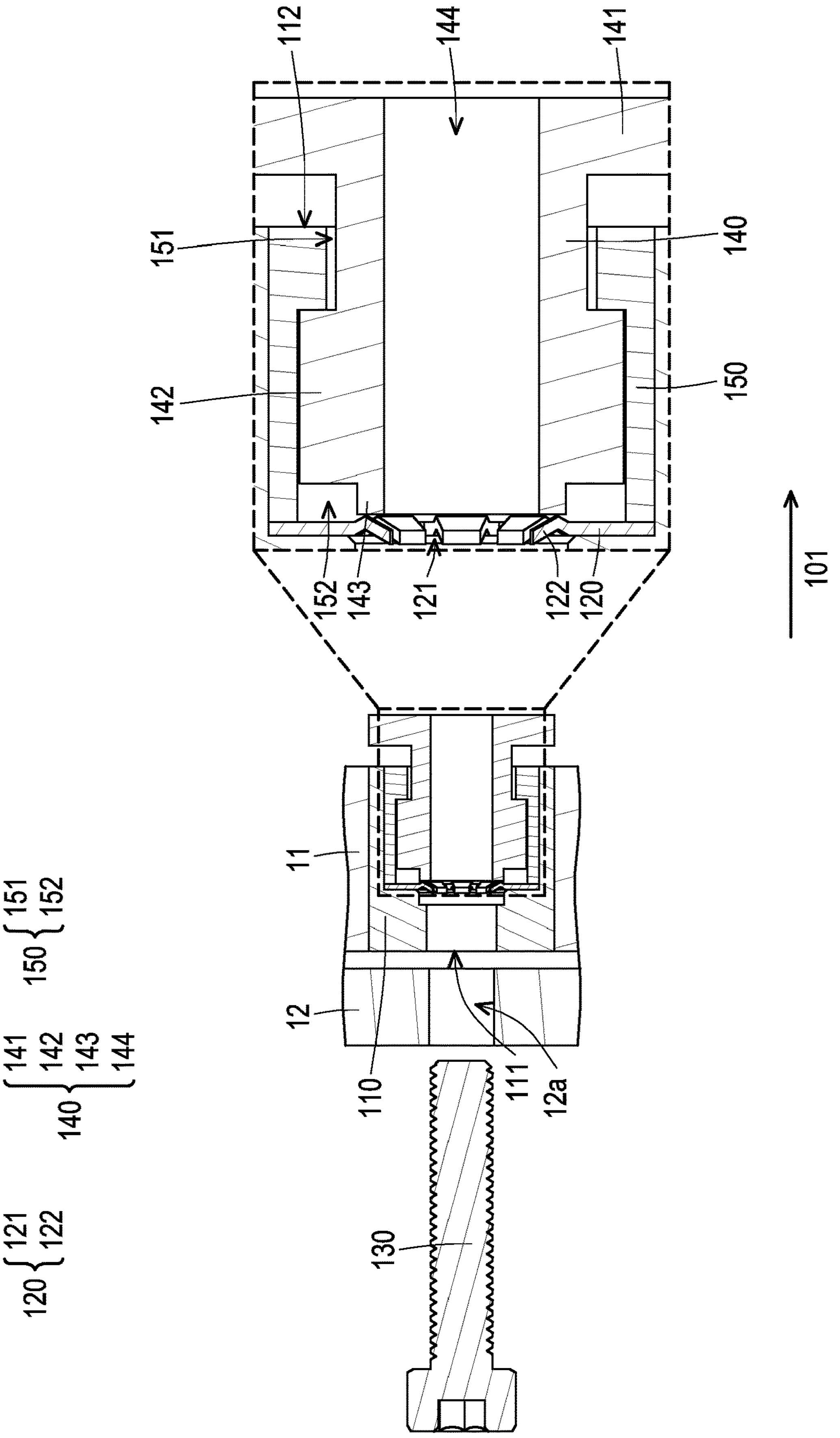

FIGS. 5 and 6 are schematic views of a disassembly process of a bolt and a second positioning member in FIG. 2. As shown in FIGS. 2, 5, and 6, when the operator presses the pressing portion 141 along a second direction 102 opposite to the first direction 101, the button 140 slides towards the first opening 111 to push the positioning elastic pieces 122 through the unlocking portion 143 to deform.

As shown in FIGS. 5 and 6, the deformed positioning elastic pieces 122 are separated from the thread 132 to release the structural interference caused by the positioning washer 120 on the bolt 130, so that the bolt 130 is loosened from the positioning washer 120. When the bolt 130 is loosened from the positioning washer 120, the second positioning member 12 is not pressed against by the head 131 of the bolt 130 to be loosened from the first positioning member 11, and the operator may remove the bolt 130 and the second positioning member 12 along the second direction 102.

As shown in FIGS. 5 and 6, once the operator removes a pressing force applied on the button 140, an elastic restoring force of the positioning elastic pieces 122 may push the button 140 to slide back to an initial position along the first direction 101.

As shown in FIGS. 2, 5, and 6, the operator may quickly fix the second positioning member 12 to the first positioning member 11 or remove the second positioning member 12 from the first positioning member 11 through a two-way pressing mechanism. That is to say, the positioning structure 100 and the positioning device 10 using the positioning structure 100 are not only convenient for the operator to quickly disassemble and assemble, but a disassembly and assembly mechanism is also quite simple and intuitive.

As shown in FIGS. 2 and 4, in this embodiment, the second bush 150 has a first via 151 corresponding to the second opening 112 and a second via 152 communicating with the first via 151, and the second via 152 is located between the positioning washer 120 and the first via 151. In detail, the button 140 is inserted into the second via 152 through the first via 151. The sliding portion 142 and the unlocking portion 143 are located in the second via 152, and the sliding portion 142 is closer to the first via 151 than the unlocking portion 143.

As shown in FIG. 4, an aperture D1 of the first via 151 is less than an aperture D2 of the second via 152, and an outer diameter D3 of the unlocking portion 143 is less than an outer diameter D4 of the sliding portion 142. In addition, the outer diameter D4 of the sliding portion 142 is less than the aperture D2 of the second via 152, and is greater than the aperture D1 of the first via 151, so as to facilitate the sliding of the button 140 relative to the second bush 150 and prevent the button 140 from slipping off the second bush 150 through the first via 151.

Based on the above, the operator may quickly fix the second positioning member 12 to the first positioning member 11 or remove the second positioning member 12 from the first positioning member 11 through the two-way pressing mechanism. That is to say, the positioning structure 100 and the positioning device 10 using the positioning structure 100 in the disclosure are not only convenient for the operator to quickly disassemble and assemble, but the disassembly and assembly mechanism is also quite simple and intuitive.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A positioning structure, comprising:

a first bush having a first opening and a second opening opposite to and communicating with each other;

a positioning washer fixed in the first bush and comprising a positioning hole aligned to the first opening and a plurality of positioning elastic pieces circumferentially arranged in the positioning hole;

a bolt adapted to be inserted into the first bush from the first opening and passing through the positioning hole, wherein at least one of the positioning elastic pieces is engaged with a thread of the bolt, so that the bolt is fixed by the positioning washer; and a button inserted into the first bush from the second opening and contacting the positioning elastic pieces, wherein the button is adapted to slide toward the first opening and push the positioning elastic pieces to deform, so that the positioning elastic pieces are separated from the thread, and the bolt is loosened from the positioning washer.

2. The positioning structure according to claim 1, wherein the button has a through hole aligned to the positioning hole, and the bolt is adapted to pass through the through hole.

3. The positioning structure according to claim 1, further comprising:

a second bush inserted into the first bush from the second opening and pressing against the positioning washer, wherein the second bush is fixed in the first bush, and the button is slidably disposed on a side of the second bush opposite to the positioning washer.

4. The positioning structure according to claim 3, wherein the second bush has a first via corresponding to the second opening and a second via communicating with the first via, the second via is located between the positioning washer and the first via, the button is inserted into the second via through the first via, and the button comprises a sliding portion disposed in the second via and an unlocking portion connected to the sliding portion, wherein the unlocking portion is located between the sliding portion and the positioning washer, and the unlocking portion contacts the positioning elastic pieces.

5. The positioning structure according to claim 4, wherein an aperture of the first via is less than an aperture of the second via, an outer diameter of the unlocking portion is less than an outer diameter of the sliding portion, and the outer diameter of the sliding portion is greater than the aperture of the first via.

6. A positioning device, comprising:

a first positioning member comprising an installation hole;

a positioning structure adapted to be installed in the installation hole, wherein the positioning structure comprises:

a first bush fixed in the installation hole, and having a first opening and a second opening opposite to and communicating with each other;

a positioning washer fixed in the first bush and comprising a positioning hole aligned to the first opening and a plurality of positioning elastic pieces circumferentially arranged in the positioning hole;

a bolt; and a button inserted into the first bush from the second opening and contacting the positioning elastic pieces of the positioning washer; and a second positioning member having a bolt hole, wherein the bolt is adapted to pass through the bolt hole and be inserted into the positioning structure in the installation hole to which the bolt hole is aligned, the bolt is inserted into the first bush from the first opening and passes through the positioning hole of the positioning washer, and at least one of the positioning elastic pieces of the positioning washer is engaged with a thread of the bolt, so that the bolt is fixed by the positioning washer, and a head of the bolt presses against the second positioning member to fix the second positioning member to the first positioning member, when the button slides toward the first opening and pushes the positioning elastic pieces to deform, the positioning elastic pieces are separated from the thread, so that the bolt is loosened from the positioning washer, and the second positioning member is loosened from the first positioning member.

7. The positioning device according to claim 6, wherein the button has a through hole aligned to the positioning hole, and the bolt is adapted to pass through the through hole.

8. The positioning device according to claim 6, wherein the positioning structure further comprises:

a second bush inserted into the first bush from the second opening and pressing against the positioning washer, wherein the second bush is fixed in the first bush, and the button is slidably disposed on a side of the second bush opposite to the positioning washer.

9. The positioning device according to claim 8, wherein the second bush has a first via corresponding to the second opening and a second via communicating with the first via, the second via is located between the positioning washer and the first via, the button is inserted into the second via through the first via, and comprises a sliding portion disposed in the second via and an unlocking portion connected to the sliding portion, wherein the unlocking portion is located between the sliding portion and the positioning washer, and the unlocking portion contacts the positioning elastic pieces.

10. The positioning device according to claim 9, wherein an aperture of the first via of the second bush is less than an aperture of the second via, an outer diameter of the unlocking portion is less than an outer diameter of the sliding portion, and the outer diameter of the sliding portion is greater than the aperture of the first via.

* * * * *